United States Patent [19]

Gelfand et al.

[11] 4,116,578
[45] Sep. 26, 1978

[54] ROTARY TOOL FOR MAKING HOLES

[76] Inventors: Mikhail Lvovich Gelfand, Yaroslavskoe shosse, 129, kv. 44; Boris Grigorievich Goldshtein, ulitsa Molodogvardeiskaya, 24, korpus 1, kv. 26; Leonid Avrumovich Gornik, ulitsa Krasny Kazanets, 3, korpus 5, kv. 139, all of Moscow; Jury Pavlovich Shishulin, Jubileiny prospekt, 18, kv. 30, Khimki Moskovskoi oblasti; Yakov Isaakovich Tsipenjuk, ulitsa Kirova, 5, Solntsevo Moskovskoi oblasti; Oleg Semenovich Tsygankov, bulvar Yana Rainisa, 14, kv. 94, korpus 2, Moscow, all of U.S.S.R.

[21] Appl. No.: 767,785

[22] Filed: Feb. 11, 1977

[51] Int. Cl.² ............................................. B23B 51/00
[52] U.S. Cl. ................................... 408/222; 408/219; 408/225
[58] Field of Search ............... 408/215, 216, 217, 218, 408/219, 220, 221, 222, 223, 224, 225, 226

[56] References Cited

U.S. PATENT DOCUMENTS

| | | | |
|---|---|---|---|
| 93,824 | 8/1869 | Humphreys | 408/219 |
| 213,937 | 4/1879 | Reichardt | 408/223 |
| 347,864 | 8/1886 | Berg | 408/219 |
| 410,614 | 9/1889 | Steiner | 408/220 |
| 1,478,414 | 12/1923 | Wells | 408/224 |
| 2,029,514 | 2/1936 | Thomson | 408/217 |
| 2,735,116 | 2/1956 | Mueller | 408/226 |
| 2,737,670 | 3/1956 | Conner | 408/217 |

*Primary Examiner*—Harrison L. Hinson
*Attorney, Agent, or Firm*—Robert E. Burns; Emmanuel J. Lobato; Bruce L. Adams

[57] ABSTRACT

A rotary tool having a working part and a shank. The working part is formed by at least two axial portions of which the first portion is made with the profile of a twist drill for making a pilot hole, and the second portion is disposed axially between the first portion and the shank. The second portion is made in such a manner as to enlarge the pilot hole upon entering it and to ensure self-feed of the tool in the axial direction. This permits substantial reduction of required force for axial feed of the tool, improves productivity and allows making holes of different diameter with one and the same tool.

4 Claims, 9 Drawing Figures

ROTARY TOOL FOR MAKING HOLES

BACKGROUND OF THE INVENTION

The invention relates to tools for machining various materials, and more particularly to rotary tools for making holes in various materials. The invention may be most advantageously used for making holes in sheet materials.

At present, rotary tools are known for making holes comprising a working part and a shank for clamping in a portable tool, such as in a portable drill. The working part of the known rotary tools is made with the profile of a drill, tap, reamer or combination, e.g. drill/tap.

With the use of such tools, an axial feed force should be, however, applied which depends on the diameter of the working part, properties of the material being machined, rotary speed of the tool and other factors.

It should be noted that in a number of applications feed forces attain values inadmissible for portable tools for which the limit feed force is normally specified by Safety Rules.

It is widely known to use, in portable drills, various mechanical, pneumatic and hydraulic feed assemblies which provide a required feed of the working part of the tool during drilling. These feed assemblies, are, however, complicated, cumbersome and costly.

It making holes with portable tools, the operator cannot, in some cases provide for application of the required feed force, e.g. because of the absence of restraint or for other reasons. In many applications there is no restraint for abuttment of the feed assembly of a portable drill. In some instances, a hole is to be drilled with several tools in the order of increased diameter so as to reduce the feed force required, and such method is associated with unproductive time losses for change of tools.

SUMMARY OF THE INVENTION

It is an object of the invention to eliminate the above-mentioned disadvantages.

Another object of the invention is to provide a rotary tool for making holes having a working part which enables substantial reduction of the feed force required independently of properties of the material being machined and the rotary speed of the tool.

These and other objects are accomplished by a rotary tool for making holes, having a working part and a shank, according to the invention the working part is formed of at least two axial portions of which the first, distal portion is made with the profile of a twist drill for making a pilot hole, and the second portion, which is disposed axially between the first portion. The shank, is made in such a manner as to enlarge the pilot hole upon entering it and to ensure self-feed in the axial direction.

In accordance with the invention, the second portion of the rotary tool is made with the diameter increasing towards the shank and is provided with cutting teeth which are arranged along a variable pitch helical line with the pitch increasing from the first portion towards the shank, the height of the teeth increasing towards the shank, maximum pitch of the helical line being substantially smaller than minimum diameter of the second portion.

This construction of the working part of the rotary tool provides for making a hole with application of but a very low feed force, because a pilot hole is made by the front end portion having the profile of a twist drill of minimal diameter thus requiring a very small feed force. Then the second portion starts working, which, due to its construction, provides by itself the feed of the tool due to a varying pitch of the cutting teeth, while the increasing diameter (that is tapered shape) of this portion ensures the enlargement of the hole to a required size. The resulting threads are cut-off by adjacent teeth of the second portion due to the increased pitch and height of the teeth thus making a relatively smooth hole.

The rotary tool is preferably provided with a third portion disposed axially between the second portion and the shank and made with the profile of a reamer thus ensuring a good finish of the hole wall.

In accordance with one embodiment of the invention, the working part of the rotary tool is formed by a plurality of combinations of second and third portions, the diameter of the second portion within each combination increasing towards the shank.

With this embodiment of the working part of the tool, different fixed diameters of holes may be obtained using one and the same tool.

A part of the second portion of the tool adjacent to the shank is preferably made with the profile of a tap. This makes the tool versatile, since it may be used not only for making holes, but also for tapping.

Therefore, the rotary tool for making holes according to the invention has the following advantages as compared with the known tools:

it does not substantially require application of an axial feed force during making the hole thus lowering fatigue of the operator, improves porductivity and permits working under conditions which do not allow feed force application;

it enables making holes of different diameters without changing tools.

In addition, the rotary tool according to the invention may be used for making holes with impact wrenches which is particularly conveninet in assemblying steel structures. This permits an improvement of use factor of impact wrenches and cut down investments in portable drills. Drilling holes with impact wrenches when using conventional tools (twist drills) is impossible because such tools require large torque.

BRIEF DESCRIPTION OF THE DRAWINGS

The invention will now be described in details with reference to specific embodiments thereof illustrated in the accompanying drawings, in which.

DESCRIPTION OF THE PREFERRED EMBODIMENTS

The rotary tool for making holes comprises a working part 1 (FIGS. 1 and 2) and a shank 2 for clamping in any portable tool.

Figure 3:
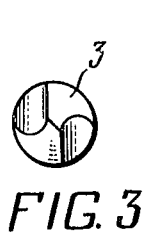
FIG. 3 is an end view taken along the arrow A in FIG. 1.

The working part 1 is formed by two portions 3 and 4. The first and distal portion 3 is made with the profile of a twist drill (FIG. 3) for making a pilot hole, e.g. in any sheet material.

The second portion 4 (FIG. 2) which is disposed axially between the first portion 3 and the shank 2 has a length which is substantially greater than the length of the portion 3 and is made in such a manner as to enalrge the pilot hole upon entering it and to ensure axial self-feed. For that purpose, the second portion 4 has the diameter increasing towards the shank 2, that is the portion 4 is tapered, and its initial part adjacent to the portion 3 is of a diameter $d$ which is smaller than the final diameter $d_1$ of that part of the portion 4 which is adjacent to the shank 2.

It should be noted that the ratio of diameters $d_1 : d$ is 1.5-2 and greater so as to provide for minimal feed force at the beginning of drilling.

Figure 4:
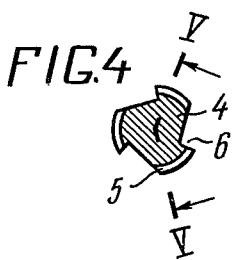
FIG. 4 is a sectional view taken along the section line IV—IV in FIG. 1.
Figure 5:
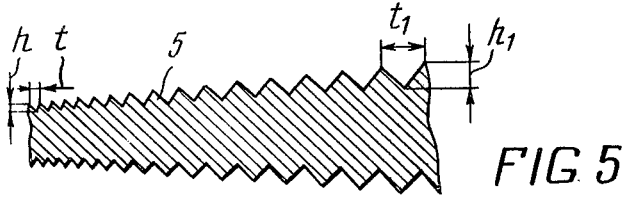
FIG. 5 is a longitudinal section view, on an enlarged scale, of a part of the second portion of the tool in FIG. 1 or 2.

The second portion 4 has cutting teeth 5 (FIGS. 4, 5) arranged along a helical line (FIGS. 1, 2 and 5) which variable pitch $t-t_1$ increasing from the portion 3 towards the shank 2, the height $h$ of the teeth 5 increases from the beginning of the portion 4 towards the shank to $h_1$.

Maximum pitch $t_1$ of the helical line of the teeth 5 is substantially smaller than the minimum diameter $d$ of the second portion 4. The teeth 5 are separated by regularly spaced recesses 6 (FIG. 4) which define longitudinal grooves 7 (FIG. 2).

Figure 2:
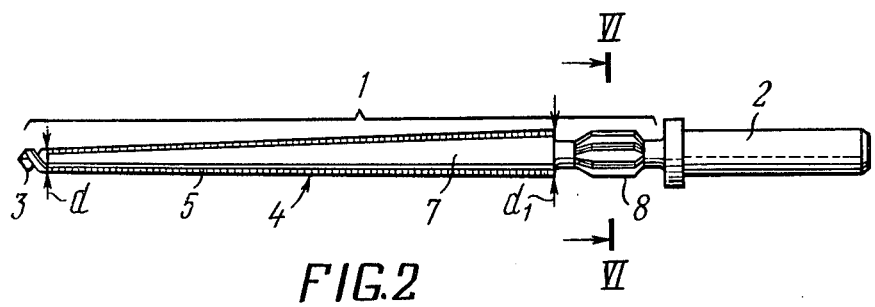
FIG. 2 is a longitudinal side view of an embodiment of the rotary tool according to the invention.
Figure 6:
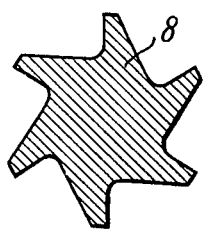
FIG. 6 is a sectional view taken along the section line VI—VI in FIG. 2.

The rotary tool may be provided with a third portion 8 disposed between the second portion 4 and the shank 2 which is made with the profile of a reamer (as shown in FIGS. 2 and 6).

Figure 7:
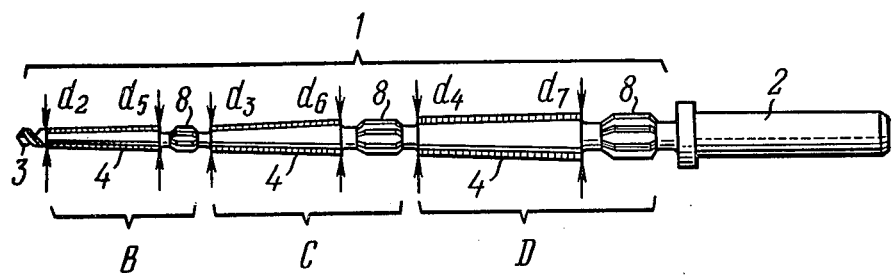
FIG. 7 is another longitudinal side view of an embodiment of a rotary tool according to the invention.

FIG. 7 shows a rotary tool in which the working part 1 is formed by a plurality of combination B, C, D of the second portions 4 and the third portions 8, the diameter of the beginning of the second portion 4 within each combination B, C, D increasing towards the shank 2 and being equal to $d_2, d_3, d_4$, respectively, so that the tool has the shape shown in FIG. 6.

Figure 8:
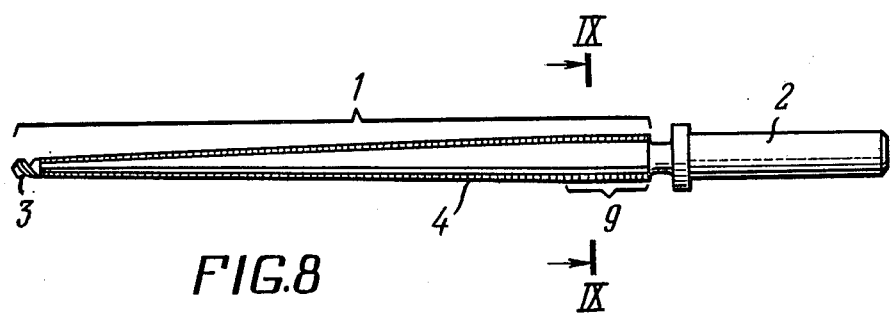
FIG. 8 is still another longitudinal side view of an embodiment of a rotary tool according to the invention.
Figure 9:
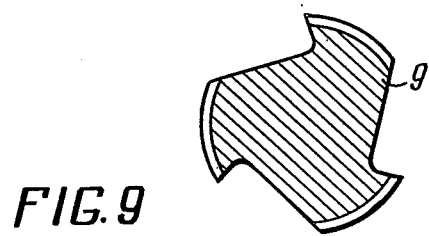
FIG. 9 is a sectional view taken along the section line IX—IX in FIG. 8.

In the embodiment of the rotary tool shown in FIG. 8, a part 9 of the second portion 4 adjacent to the shank 2 is made with the profile of a tap (FIG. 9).

The rotary tool functions in the following manner.

The rotary tool according to the invention is clamped with its shank 2 (FIGS. 1, 2) in any conventional portable drill or in an impact wrench. The portable tool is placed in a position, in which the first portion 3 of the tool is in contact with a workpiece in which the hole is to be made. Then the drive motor is turned on, and the tool is fed to the workpiece by applying a very small force. Once the portion 3 is fed in the workpiece material thus forming a pilot hole, the teeth 5 (FIGS. 4 and 5) of the second portion 4 start cutting to enlarge the pilot hole and, at the same time, to perform self-feed of the tool in the axial direction due to the development of the axial component of the force generated from rotation of the tool at the helical surfaces of the teeth 5.

After the hole is made at the whole depth, the portion 8 (FIG. 2) made with the profile of a reamer starts working to size the resultant hole.

The rotary tool shown in FIG. 7 which has a plurality of combinations B, C, D of the portions 4 and 8 allows different holes to be made with diameters corresponding to the diameters $d_5, d_6$ and $d_7$ of the final parts of the portions 4 of the combinations B, C, and D, respectively.

The sizing of the resultant holes is effected by the portions 8 of the combinations B, C, D. This tool functions similarly to that described above, and for obtaining a hole of a diameter $d_7$ in a workpiece, the portions 4 of the combinations B, C, D of the tool are self-fed through the pilot hile made by the portion 3.

Figure 1:
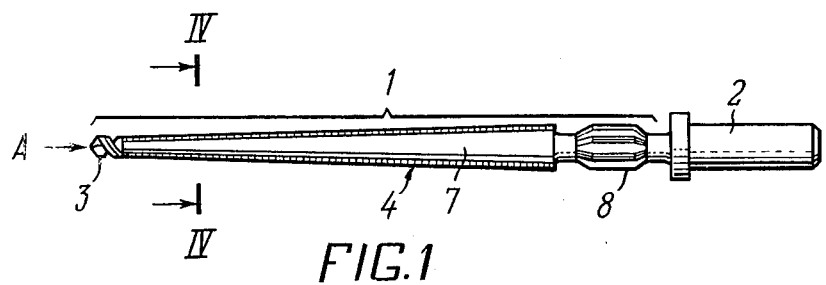
FIG. 1 in a longitudinal side view diagrammatically, illustrating a rotary tool for making holes.

The tool shown in FIG. 8 functions similarly to that shown in FIG. 1, with the only difference that the portion 9 disposed immediately adjacent to the portion 4 and made with the profile of a conventional tap effects tapping of the resultant hole.

What is claimed is:

1. A rotary tool for making holes, comprising: a working part; a shank; said working part comprising at least two axial portions of which a first distal, portion is made with a profile of a twist drill for making a pilot hole, and a second portion, disposed axially between the first portion and said shank, made with a diameter increasing from the first portion towards said shank, whereby said pilot hole is enlarged after the tool enters it; said second portion having cutting teeth arranged along a varying pitch helical line in the second portion of said working part with the pitch increasing from the first portion towards said shank, the teeth having a height increasing towards said shank, a maximum pitch of the helical line being substantially smaller than a minimum diameter of the second portion, whereby self-feed of the tool in an axial direction is ensured.

2. A rotary tool for making holes comprising: a working part; a shank; said working part comprising three axial portions of which a first, distal portion is made with a profile of a twist drill for making a pilot hole, a second portion, disposed axially between the first portion and said shank, and a third portion disposed axially between the second portion and said shank and made with a profile of a reamer; the second portion of said working part having a diameter increasing from the first portion towards the third portion, whereby the pilot hole is enlarged after the tool enters it; cutting teeth arranged along a varying pitch helical line in the second portion of said working part with the pitch increasing from the first portion towards the third portion, the teeth having the height increasing towards the third portion, maximum pitch of the helical line being substantially smaller than minimum diameter of the second portion, whereby self-feed of the tool in the axial direction is ensured.

3. A rotary tool according to claim 2, wherein the working part comprises a plurality of combinations of second and third portions, the diameter of the second portion within each combination increasing towards the shank.

4. A rotary tool for making holes comprising: a working part; a shank; said working part comprising at least two axial portion of which a first, distal portion is made with the profile of a twist drill for making a pilot hole, and a second portion disposed axially between the first portion and said shank, made with a diameter increasing from the first portion towards said shank, whereby the pilot hole is enlarged after the tool enters it; cutting teeth arranged along a variable pitch helical line in the second portion with the pitch increasing from the first portion towards said shank, the teeth having a height increasing towards said shank, maximum pitch of the helical line being substantially smaller than minimum diameter of the second portion, whereby self-feed of the tool in an axial direction is ensured; a part of the second portion adjacent to said shank having a profile of a tap.

* * * * *